US011023621B2

(12) United States Patent
Torres et al.

(10) Patent No.: US 11,023,621 B2
(45) Date of Patent: Jun. 1, 2021

(54) SYSTEM AND METHOD FOR AUTHENTICATING AND IP LICENSING OF HARDWARE MODULES

(71) Applicants: UNIVERSITE DE MONTPELLIER, Montpellier (FR); CENTRE NATIONAL DE LA RECHERCHE SCIENTIFIQUE, Paris (FR)

(72) Inventors: Lionel Torres, Combaillaux (FR); Jérôme Rampon, Gallargues le Montueux (FR); Gaël Paul, Bouc Bel Air (FR)

(73) Assignees: Universite de Montpellier, Montpellier (FR); Centre National de la Recherche Scientifique, Paris (FR)

( * ) Notice: Subject to any disclaimer, the term of this patent is extended or adjusted under 35 U.S.C. 154(b) by 218 days.

(21) Appl. No.: 15/742,267

(22) PCT Filed: Jul. 6, 2016

(86) PCT No.: PCT/FR2016/051718
§ 371 (c)(1),
(2) Date: Jan. 5, 2018

(87) PCT Pub. No.: WO2017/006058
PCT Pub. Date: Jan. 12, 2017

(65) Prior Publication Data
US 2018/0196965 A1      Jul. 12, 2018

(30) Foreign Application Priority Data
Jul. 7, 2015   (FR) ...................................... 1556418

(51) Int. Cl.
*G06F 21/76*   (2013.01)
*G06F 21/79*   (2013.01)
(Continued)

(52) U.S. Cl.
CPC ............ *G06F 21/76* (2013.01); *G06F 21/105* (2013.01); *G06F 21/125* (2013.01); *G06F 21/79* (2013.01);
(Continued)

(58) Field of Classification Search
None
See application file for complete search history.

(56) References Cited

U.S. PATENT DOCUMENTS

| 5,434,917 A | 7/1995 | Naccache et al. |
| 6,904,527 B1 | 6/2005 | Parlour et al. |

(Continued)

FOREIGN PATENT DOCUMENTS

| EP | 0583709 A1 | 2/1994 |
| JP | 2004-021394 A | 1/2004 |

OTHER PUBLICATIONS

Authorized Officer: Sauzon, Guillaume, "International Search Report" issued in counterpart PCT application No. PCT/FR2016/051718, dated Sep. 13, 2016.
(Continued)

*Primary Examiner* — Eleni A Shiferaw
*Assistant Examiner* — Bassam S Noaman
(74) *Attorney, Agent, or Firm* — Kaplan Breyer Schwarz, LLP

(57) ABSTRACT

The invention relates to a license-verification circuit for selectively activating one or more protected circuits (206) of a device (102) the license-verification circuit being capable of: deducing a device key from an identifier associated with the device (102); receiving a first license; decrypting the first license using the device key in order to extract a first verification code activating a first protected circuit by load-
(Continued)

ing an activation code in an activation log (212) associated with the first protected circuit on the basis of a verification of the first verification code.

16 Claims, 5 Drawing Sheets

(51) Int. Cl.
  *G06F 21/12* (2013.01)
  *G06F 21/10* (2013.01)
  *H04L 9/08* (2006.01)
  *H04L 9/32* (2006.01)

(52) U.S. Cl.
  CPC .......... *H04L 9/0866* (2013.01); *H04L 9/3271* (2013.01); *G06F 2221/2101* (2013.01)

(56) References Cited

U.S. PATENT DOCUMENTS

| | | | |
|---|---|---|---|
| 8,732,468 | B2 | 5/2014 | Roy et al. |
| 2010/0284539 | A1 | 11/2010 | Roy et al. |
| 2011/0109425 | A1* | 5/2011 | Kan .................. G06F 21/73 340/5.2 |
| 2011/0113392 | A1 | 5/2011 | Chakraborty et al. |
| 2014/0044265 | A1* | 2/2014 | Kocher ............... H04L 63/0823 380/277 |
| 2014/0093074 | A1 | 4/2014 | Gotze et al. |
| 2014/0189890 | A1 | 7/2014 | Koeberl et al. |
| 2014/0340112 | A1* | 11/2014 | Tehranipoor .......... H04L 9/0869 326/8 |
| 2014/0359755 | A1* | 12/2014 | Beitel .................. G06F 21/572 726/18 |
| 2016/0342777 | A1* | 11/2016 | Sadhasivan ............. G06F 21/14 |

OTHER PUBLICATIONS

Jiawei Huang et al, "IC Activation and User Authentication for Security-Sensitive Systems", Hardware-Oriented Security and Trust, 2008. Host 2008. IEEE International Workshop on, IEEE, Piscataway, NJ, USA Jun. 9, 2008.

Office Action issued in co-pending EP application No. 16750929.8, dated Feb. 22, 2019, 7 pp. with English translation.

Bossuet et al., "A PUF Based on a Transient Effect Ring Oscillator and Intensive to Locking Phenomenon", IEEE Transactions on Emerging Topics in Computing, Mar. 2014, pp. 30-36, vol. 2, No. 1.

Cherif et al., "An Easy-to-Design PUF based on a Single Oscillator: the Loop PUF", 15th Euromicro Conference on Digital System Design, 2012, pp. 156-162.

Bayon et al., "EM radiation analysis on true random number generators: Frequency and localization retrieval method", Jun. 13, 2013, 5 pp.

Roy et al., "EPIC: Ending Piracy of Integrated Circuits", pp. 1-5.

Guajardo et al., "FPGA Intrinsic PUFs and Their Use for IP Protection", 18 pp.

Huang et al., "IC Activation and User Authentication for Security-Sensitive Systems", 5 pp.

Gustavus J. Simmons, "Identification of Data, Devices, Documents and Individuals", IEEE, 1991, pp. 197-218.

Officer Guillaume Sauzon, "International Search Report and the Written Opinion", PCT/FR2016/051718, dated Sep. 13, 2016, 18 pp.

Suh et al., "Physical Unclonable Functions for Device Authentication and Secret Key Generation", DAC 2007, Jun. 4-8, 2007, 6 pp.

Maes et al., "Physically Unclonable Functions: a Study on the State of the Art and Future Research Directions.", pp. 1-36.

Katzenbeisser et al., "PUFs: Myth, Fact or Busted? A Security Evaluation of Physically Unclonable Functions (PUFs) Cast in Silicon", 18 pp.

Merli et al., "Semi-invasive EM Attack on FPGA RO PUFs and Countermeasures", 9 pp.

Gassend et al., "Silicon Physical Random Functions, Computer Science and Artificial Intelligence Laboratory", Nov. 18-22, 2002, 14 pp.

English Translation of Japanese Office Action dated Jun. 23, 2020 issued in Japanese Patent Application No. 2018-520030.

Jerom Rampon et al., Digital Right Management for IP Protection, 2015 IEEE Computer Society Annual Symposium on VLSI, U.S., IEEE, Jul. 8, 2015, p. 200-203.

\* cited by examiner

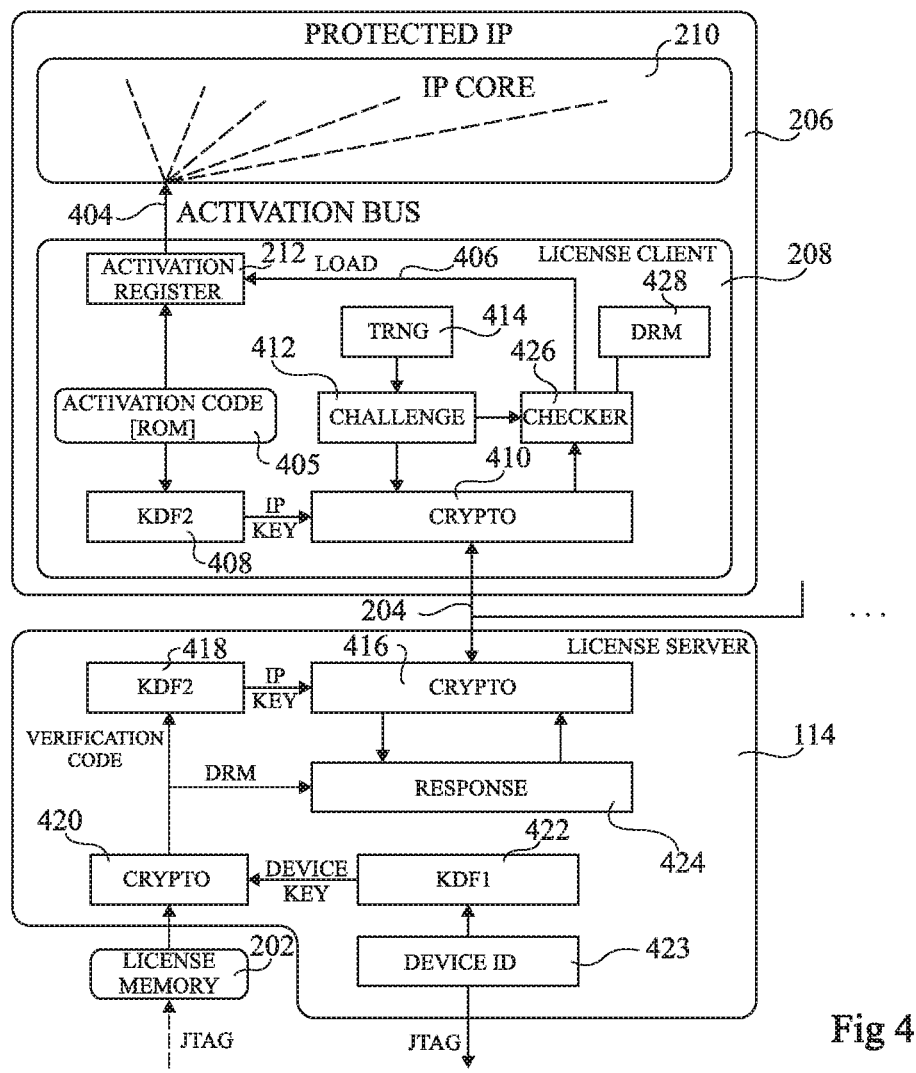
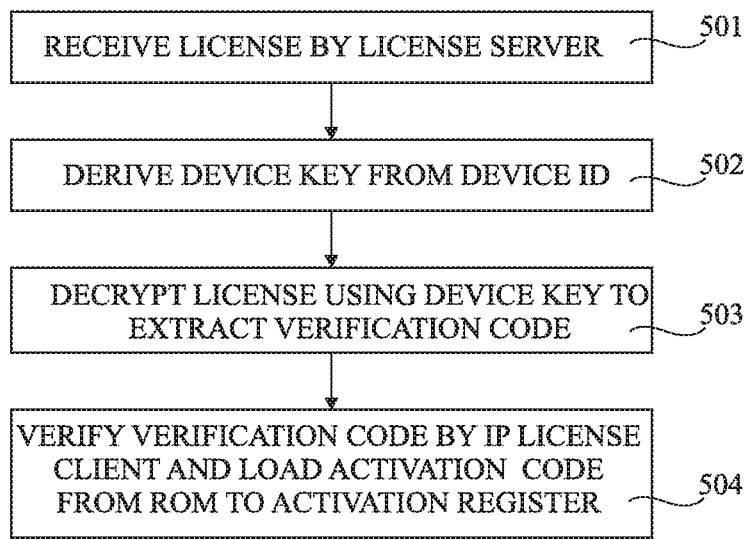
Fig 4
Fig 5

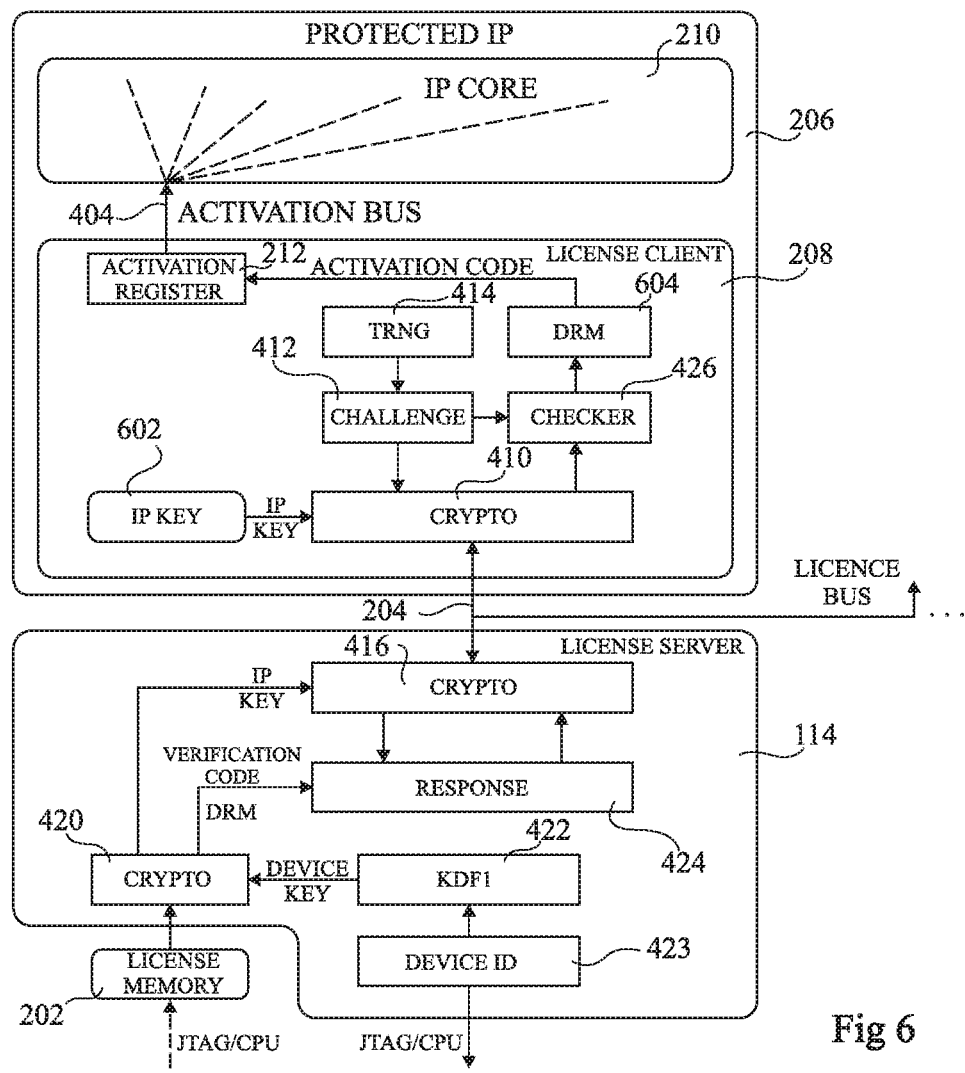
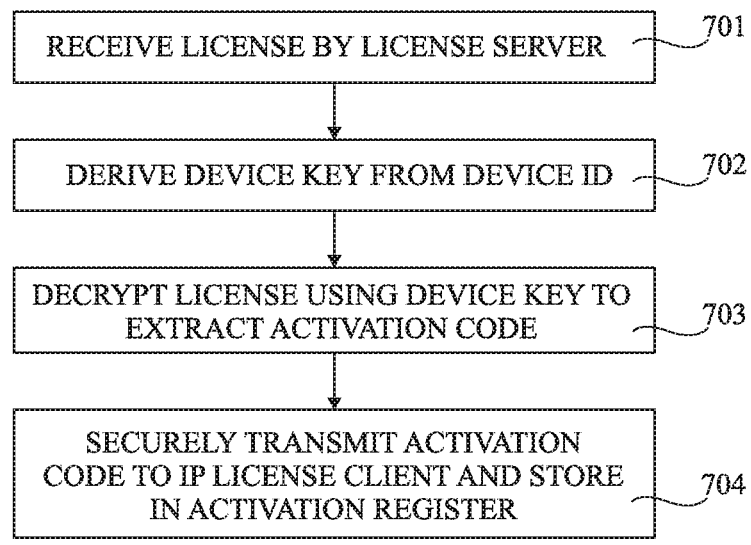
Fig 6
Fig 7

SYSTEM AND METHOD FOR AUTHENTICATING AND IP LICENSING OF HARDWARE MODULES

The present patent application claims priority from the French patent application FR15/56418, which is hereby incorporated by reference.

FIELD

The present disclosure relates to the field of integrated circuits and in particular to a method and system allowing the authentication and licensing of IP (intellectual property) blocks within an integrated circuit, or more generally the authentication and licensing of any circuit or system.

BACKGROUND

Integrated circuits generally comprise a collection of circuit blocks known in the field as IP (intellectual property) blocks. IP blocks correspond to discrete hardware circuit designs that perform specific functions and may be reused in various different integrated circuits. The IP blocks in a given integrated circuit (IC) are generally licensed to the IC designer by the IP rights holders of the IP blocks.

IP blocks are generally delivered to the IC designer as software, for example in a hardware description language such as RTL (Register Transfer Level), Verilog or VHDL (Very high speed integrated circuit Hardware Description Language). The IP rights holder often grants a license to the IC designer to use their IP block in a limited number of integrated circuits and/or a limited number of projects, or requests a royalty payment for each integrated circuit/project that incorporates the IP block. However, integrated circuit piracy is becoming an increasing problem. Indeed, from the moment that the IP block is delivered to the IC designer, it is very difficult for the IP rights holder to control how their IP block is used and to limit the number of integrated circuits manufactured using their design.

Some solutions have been proposed for allowing IP rights holders to lock their circuit designs. However, existing solutions tend to be complex, costly and/or not sufficiently secure.

SUMMARY

It is an aim of embodiments of the present disclosure to at least partially address one or more needs in the prior art.

According to one aspect, there is provided a license verification circuit for selectively activating one or more protected circuits of a device, the license verification circuit being adapted to: derive a device key from an identifier associated with the device; receive a first license; decrypt the first license using the device key in order to extract a first verification code; and activate a first protected circuit by loading an activation code into an activation register associated with the first protected circuit based on a verification of the first verification code.

According to one embodiment, the identifier associated with the device is provided by a PUF (physically unclonable function).

According to one embodiment, the license verification circuit is adapted to read the identifier associated with the device over an interface protected by encryption.

According to one embodiment, the license verification circuit further comprises: a license server comprising a key derivation circuit for deriving the device key and a decryption circuit for decrypting the first license; a first license client associated with the first protected circuit and comprising a first control circuit for activating the first protected circuit based on the first verification code; and a second license client associated with a second protected circuit and comprising a second control circuit adapted to activate the second protected circuit by loading a second activation code into an activation register associated with the second protected circuit.

According to one embodiment, the license server is adapted to transmit the first verification code to the first license client and the second verification code to the second license client.

According to one embodiment, the first verification code is encrypted by the license server based on a further key extracted from the first license and transmitted to the first control circuit of the first license client.

According to one embodiment, the decryption circuit is further adapted to extract the further key from the first license.

According to one embodiment, the first verification code comprises the activation code encrypted using an IP vendor key, the first license client being further adapted to store the IP vendor key in a memory and to decrypt the first verification code based on the IP vendor key to extract the activation code.

According to one embodiment, the first license client comprises: a challenge generation circuit comprising a random number generator adapted to generate a challenge value and to transmit the challenge value to the license server; and a first response generation circuit adapted to generate a first response value based on at least the challenge value, wherein the license server comprises: a second response generation circuit adapted to receive the challenge value and to generate a second response value based on at least the challenge value, wherein the first license client further comprises a verification circuit adapted to compare a first response value with the second response value.

According to one embodiment, the first and second response generation circuits are adapted to generate the first and second response values based on a hash function.

According to one embodiment, the first license client comprises a non-volatile memory storing a copy of the activation code, the first control circuit being adapted to load the copy of the activation code to the activation register based on a verification of one or more values of the first verification code.

According to one embodiment, the verification code comprises further data indicating one or more of: a period of validity of the license; a geographic limit of the license; a limitation of the license to one or more hardware types; a temperature limitation of the license; a voltage limitation of the license; a bandwidth limitation of the license; a speed limitation of the license; an acceleration limitation of the license; a humidity limitation of the license; a light-level limitation of the license; a magnetic field limitation of the license; and a radioactivity limitation of the license.

According to one embodiment, the first activation code comprises a plurality of bits, and the first protected circuit comprises a plurality of logic gates adapted to selectively activate a signal path of the first protected circuit, each logic gate having a first input coupled to a node of the first protected circuit and a second input coupled to receive one of the bits stored by the activation register.

According to a further aspect, there is provided a license verification system comprising: a first IP module comprising the above license verification circuit; a second IP module comprising the above license verification circuit; and a circulator adapted to transmit the first license to the first IP module and a second license to the second IP module.

According to a further aspect, there is provided a license generation circuit comprising: a key derivation circuit adapted to derive a device key based on a device identifier of a device; and an encryption circuit adapted to generate a first license for one or more protected circuits of said device by encrypting one or more activation codes using said device key.

According to one embodiment, the encryption circuit is further adapted to encrypt a further key to be included in said first license.

According to yet a further aspect, there is provided a method of license verification for selectively activating one or more protected circuits of a device, the method comprising: deriving a device key from an identifier associated with the device; receiving a first license; decrypting the first license using the device key in order to extract a first verification code; and activating a first protected circuit by loading the first activation code into an activation register associated with the first protected circuit based on a verification of the first verification code.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 4 schematically illustrates a license server and a license client of the integrated circuit of FIG. 2 in more detail according to an example embodiment of the present disclosure;

FIG. 5 is a flow diagram illustrating operations in a method of activating an IP block based on a license using the license server and license client of FIG. 4 according to an example embodiment of the present disclosure;

FIG. 6 schematically illustrates a license server and a license client of the integrated circuit of FIG. 2 in more detail according to a further example embodiment of the present disclosure;

FIG. 7 is a flow diagram illustrating operations in a method of activating an IP block based on a license using the license server and license client of FIG. 6 according to a further example embodiment of the present disclosure;

DETAILED DESCRIPTION

While throughout the following description embodiments are described as implemented in hardware, it will be apparent to those skilled in the art that the various embodiments could be at least partially implemented by software instructions executed by one or more processors.

Throughout the following description, the following terms will be given the following definitions:

IP block—a discrete hardware circuit design that performs specific functions and may be reused in various different integrated circuits;

protected circuit—a circuit, which may correspond to an IP block, to a collection of IP blocks, or to a system comprising one or more integrated circuits, protected by a mechanism such that it is in a deactivated state unless activated by an activation code.

Figure 1A:
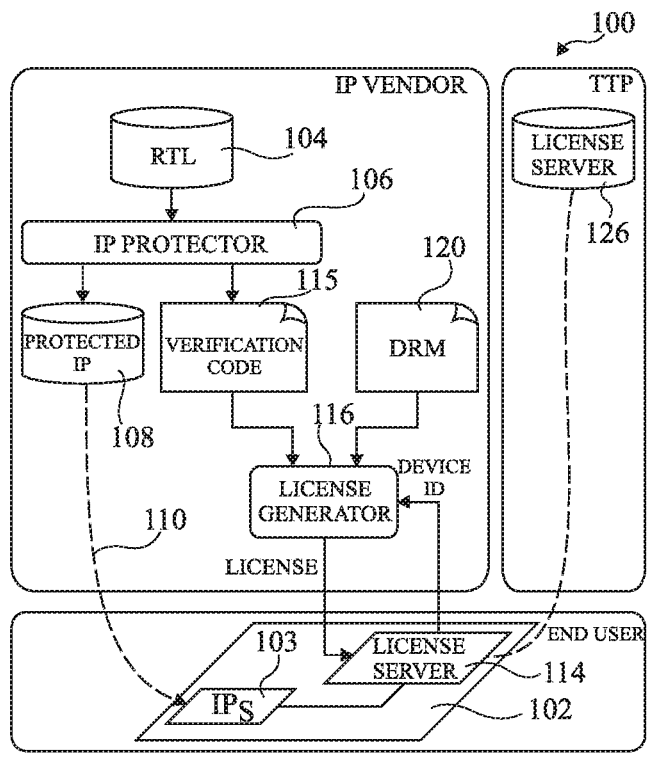
FIG. 1A schematically illustrates a system permitting IP block licensing according to an example embodiment of the present disclosure.

FIG. 1A schematically illustrates a system 100 permitting authentication and licensing of protected circuits according to an example embodiment of the present disclosure.

The system 100 includes hardware associated with three main parties, an IP vendor (IP VENDOR), a trusted third party (TTP), and an end user (END USER). The protection is based on a unitary activation of one or more protected circuits. Each protected circuit is for example a complex circuit developed to perform a precise function, such as for example an interface for managing standard protocols, a circuit capable of performing advanced operations, such as a processor, encoding or decoding circuit, etc. The protected circuits are for example implemented using one or more application specific circuits and/or using one or more field programmable gate array (FPGA).

In the example of FIG. 1A, it is assumed that a device 102 purchased or otherwise obtained by the end user includes one or more protected circuits 103. In the example of FIG. 1A, the device 102 is an integrated circuit, and the protected circuits 103 are IP blocks of the integrated circuit. However, in alternative embodiments, the device could correspond to any electronics device, and the protected circuits could each comprise a board or system having more than one integrated circuit.

The integrated circuit 102 for example forms part of a product such as mobile telephone, tablet computer, laptop computer, games console or the like, or could be a chip mounted on an integrated circuit card, including the family of cards known as smart cards, including for example payment cards, SIM (subscriber identity module) cards or the like.

According to the embodiments described herein, the one or more IP blocks 103 on the integrated circuit 102 are for example in a deactivated state when the end user receives the integrated circuit 102, and the end user activates the deactivated IP blocks by requesting a license from the IP vendor or from the TTP. However, in alternative embodiments, rather than the end user, the activation may be performed by another party in the supply chain, such as the integrated circuit designer, or a vendor of a product containing the integrated circuit 102.

The device 102 for example comprises a device identifier (DEVICE ID), which comprises a string of bits that identifies the device 102 or a group of devices 102, and which for example serves for authentication. The license that is provided by the IP vendor or TTP can only be used for a device having that identifier, and in some embodiments, the device identifier is unique for each device, such that a given license can only ever activate the protected circuits of one device 102. It would however also be possible in some embodiments to provide a single license that activates a batch of devices, which for example have the same device identifier. The device identifier is for example generated by or derived from a PUF (physically unclonable function).

The activation of one or more of the protected circuits of the device 102 may be permanent, meaning that once activated, the protected circuits of the device 102 will remain activated. Additionally or alternatively, one or more of the protected circuits could remain activated until a subsequent reset operation of the device 102, at which point a license may be needed again in order to reactivate these protected circuits. The license may remain stored on the device, and thus during a power-up sequence, a pre-reset operation (an operation before the reset signal is deactivated) involves loading the license, which is already stored in a memory, into the chip to activate one or more of the protected circuits.

Additionally or alternatively, the license may initially activate one or more of the protected circuits for a limited time duration or for a given number of clock cycles of a clock of the device. For example, this permits a demonstration mode during a temporary period, in which all or only some of the protected circuits are active, and at the end of the temporary period, a full license is for example required to activate the protected circuits.

As will become apparent from the following description, the particular activation type (permanent, until next reset, temporary) may be different for each protected circuit of the device. Furthermore, while the method described herein can be used to activate a single IP block, it can also be applied more generally to the activation of any protected circuit, which may correspond to all IP blocks of a given device, to an IP block within another IP block and/or to an IP block comprising another IP block, to a system or IC card, to the activation of all circuits in a design using a given ASIC (application specific integrated circuit) technology, to the activation of a given family of FPGA, to the activation of FPGA's produced by a given manufacturer, etc. It could also be applied at the system level. Furthermore, in some embodiments, the license can be used to activate or deactivate only a sub-set of the functions of an IP block.

As will be described in more detail below, the method and device described herein also for example permit a protected circuit or a sub-function of a protected circuit to be activated and deactivated multiple times.

An example of the process for protecting and activating an IP block will now be described in more detail. While this example is based on the protection of an IP block, as mentioned above, in alternative embodiments it could be applied to the protection of other types of circuits.

At the IP vendor, a database (RTL) 104 for example stores one or more IP blocks represented in a hardware description language such as plain RTL (Register Transfer Level) code.

An IP protector block (IP PROTECTOR) 106 for example comprises software for executing an IP protection function, which is used to modify one or more of the IP blocks from the database 104 to render the circuit inactive. In particular, the IP block is altered such that an activation code is required to unlock its functionalities. In some embodiments, this step can be performed entirely automatically, while in other embodiments it could be performed at least partially manually, for example by a designer of the IP block. As will be described in more detail below, the modification of the IP block for example involves inserting, into the hardware description file, one or more logic gates into one or more signal paths of the IP block. These logic gates for example permit the propagation of the unaltered signal along the signal path only if one or more correct activation bits are provided at one or more input nodes of the inserted logic gates. In some embodiments, the activation code may be unique to a given IP design. In other embodiments, the same activation code may be used for more than one IP design. Furthermore, in some embodiments, there may be more than one activation code that can activate an IP block. This may for example facilitate the license generation operation.

A circuit for managing the IP license, which will be referred to herein as a license client (not illustrated in FIG. 1A) is for example added to each IP block to be protected. As will be described in more detail below, the license client for example comprises a register for storing the activation code once a valid license has been supplied. In some embodiments, the license client is integrated within each IP block, although as described in more detail below, each license client could also be external to the corresponding IP block.

In some embodiments, the files representing the modified IP blocks are for example also protected by encryption.

The activation codes, and optionally part or all of the modified IP blocks, are for example stored in a database (PROTECTED IP) 108 of the IP vendor. The modified IP blocks are also delivered to a designer of integrated circuit 102 such that, as represented by an arrow 110 in FIG. 1A, one or more protected IP blocks 103 are implemented in hardware in the integrated circuit. In particular, the integrated circuit designer for example brings together various different IP blocks to form an integrated circuit, and one or more of these IP blocks for example correspond to IP blocks protected by an activation code as described herein.

The license for example comprises a verification code. The term "verification code" is used herein to designate a code that is communicated with the license and permits one or more IP blocks to be activated. This code may be the activation code for one or more IP blocks. In alternative embodiments, the activation code is already stored in a protected memory, for example a ROM, of the IP block, and the activation code is not included in the license. In this case the verification code is a secret code communicated with the license to the IP block which permits the activation code to be loaded from the protected memory to the activation code register. In some embodiments, a temporary license may be provided to the integrated circuit designer for circuit conception/testing purposes.

The integrated circuit designer also for example integrates a license server (LICENSE SERVER) 114 in the integrated circuit 102. This circuit is for example provided by the TTP, or it may be incorporated into one or more of the protected IP blocks by the IP vendor. The license server 114 is for example coupled to a port of the integrated circuit via which the license can be received. The license server 114 is also for example coupled to each protected IP block of the integrated circuit, and in particular with the license client circuit of each IP block.

The license server 114 also for example comprises a circuit for generating the device identifier, for example in the form of a PUF. As will be described in more detail below, the device identifier is for example based on the generation of a signature that is unique to the integrated circuit. Therefore, even if two integrated circuits are fabricated and/or programmed to have identical functionality, their signatures and thus their device identifiers will be different. The PUF value is for example generated by a CPU (central processing unit) of the integrated circuit, and/or based on one or more ring oscillators mounted on the integrated circuit. PUFs are for example described in more detail in the following publications: publication by David Naccache et al. entitled "Unforgeable identification device, identification device reader and method of identification", August 1992; publication by G. Simmons entitled "Identification of data, devices, documents and individuals", IEEE International Carnahan Conference on Security Technology, 1991, pp. 197-218; publication by Stefan Katzenbeisser et al. entitled "PUFs: Myth, Fact or Busted? A Security Evaluation of Physically Unclonable Functions (PUFs) Cast in Silicon", (2012), Cryptographic Hardware and Embedded Systems—CHES 2012. 14th International Workshop, Leuven, Belgium, Sep. 9-12, 2012. Proceeding, Lecture Notes in Computer Science 7428, Springer Berlin Heidelberg, pp. 283-301, doi:10.1007/978-3-642-33027-8_17, ISBN 978-3-642-33026-1; publication by Roel Maes et al. entitled "Physically Unclonable Functions: A Study on the State of the Art and Future Research Directions"; publication by L. Bossuet et al. entitled "A PUF based on a transient effect ring oscillator and insensitive to locking phenomenon", IEEE Transactions on Emerging Topics in Computing, Vol. 2, Issue 1, pp. 30-36, 2014; publication by P. Bayon et al. entitled "EM radiation analysis on true random number generators: Frequency and localization retrieval method", APEMC, 2013; publication by Z. Cherif et al. entitled "A easy-to-design PUF based on a single oscillator: the loop PUF," DSD, 2012; publication by B. Gassend et al. entitled "Silicon physical random functions", ACM CCS, pp. 148-160, 2002; publication by J. Guajardo et al. entitled "FPGA Intrinsic PUFs and Their Use for IP Protection," CHES, Springer, LNCS, vol. 4727, pp. 63-80, 2007; publication by D. Merli entitled "Semi-invasive EM attack on FPGA RO PUFs and Countermeasures" ACM WESS, 2011; and publication by G. E. Suh et al. entitled "Physical unclonable functions for device authentication and secret key generation," DAC, 2007. The contents of these eleven publications are hereby incorporated by reference to the extent permitted by the law.

When the integrated circuit is activated for a first time after fabrication and/or programming, the value of the device identifier is for example read by reading a value generated by a PUF circuit or the like. In some cases, the PUF value may change over time due to aging of the integrated circuit, and/or due to other reasons such as the environment (temperature, voltage, etc.). In some embodiments, in view of a potential change in the PUF, at least part of the generated PUF value is stored to a non-volatile memory, and/or error correction code is generated, allowing the PUF value to be corrected if certain bits of the PUF value stray from their original value. The device identifier is also made available at a port of the integrated circuit 102, or otherwise communicated outside of the integrated circuit 102, and is used to request a license for activating the protected IP blocks.

As an alternative to a PUF, another form of device identifier could be used, such as an identifier assigned to the device by the device manufacturer.

The license generation is for example performed by the IP vendor, or by the trusted third party, in response to a request from the end user or other party wishing to activate an integrated circuit 102. The license request includes the device identifier, which is read from the integrated circuit 102.

According to one example, the request for activation may include a request for the activation of multiple IPs. For example, an application may be provided, for example on an external computer coupled to the integrated circuit, that interacts with the integrated circuit 102 to obtain the device identifier. The device identifier is then transmitted to a license server (LICENSE SERVER) 126 of the trusted third party. The license server 126 for example in turn dispatches requests for licenses to each of the IP vendors of the IP modules of the integrated circuit. A customer relationship management application at the IP vendor for example consults a customer database and verifies that the license can be provided. For example, it verifies that the integrated circuit having the corresponding device identifier is not a stolen circuit, and that payment for the license has been received. The IP vendor then for example generates a license based on the device identifier, and transmits the license to the license server 126 of the TTP, where the license is for example stored and transmitted to the integrated circuit 102 for use in the activation process.

Of course, many variations could be applied to this procedure. For example, a customer database may be stored at the TTP, along with a license generation circuit for generating a license for activating one or more IP blocks of an integrated circuit based on the device identifier.

In some embodiments, a separate license is generated for each IP block to be activated. Alternatively, a license may be generated for activating a plurality of IP blocks. For example, the license comprises the verification code of each IP block to be activated.

In the case that the license is generated by the IP vendor, the verification code or codes (VERIFICATION CODE) 115 needed for unlocking the protected IP block or blocks of the integrated circuit 102 is/are for example provided to a license generator (LICENSE GENERATOR) 116 at the IP vendor. The license generator 116 is used to generate a license (LICENSE), which is for example transmitted to the license server 114 of the integrated circuit 102. The license generator 116 for example receives the device identifier (DEVICE ID) from the integrated circuit 102, and generates the license based on this identifier and on the verification code or codes. In some embodiments, the license also incorporates DRM (design right management) data 120. The DRM data for example indicates any limit on the duration of activation of an IP block, for example in the case that the license is a temporary license. It may also indicate a limitation of the license to one or more hardware types, such as a technology of ASIC, FPGA family, or specific features of an IP that are to be unlocked. The hardware type of the circuit can for example be determined by a specific sensor, and compared to the one or more authorized hardware types in order to limit the use of the IP block to these hardware types. Furthermore, additionally or alternatively the DRM data of the license may define limitation data indicating limits of the license based on other variables that can be measured by sensors of the device. For example, the DRM data may define: a temperature limit of the license, for example based on an ambient temperature sensor; a voltage limit of the license, for example based on the level of a supply voltage in the circuit; a bandwidth limit of the license; a speed limit of the license, for example based on a reading from a GPS (global positioning system) of the device; an acceleration limit of the license, based for example on a reading from an accelerometer of the device;

a humidity limit of the license, for example based on an ambient humidity sensor of the device; a light limit of the license, for example based on an ambient light sensor of the device; a magnetic field limit of the license, for example based on a measurement from a Hall effect sensor of the device; a radioactivity limit of the license, for example based on a measurement from a Geiger counter of the device; and/or other type of limit based on a measurement by a suitable sensor.

In some embodiments, the DRM data modifies the verification code. For example, in some embodiments, the verification code comprises the activation code, and some bits of the activation code are not provided or incorrect such that only part of the IP block is activated by the activation code. In other embodiments, other techniques could be used, which are not based on a bit by bit activation/deactivation of the IP block.

Figure 1B:
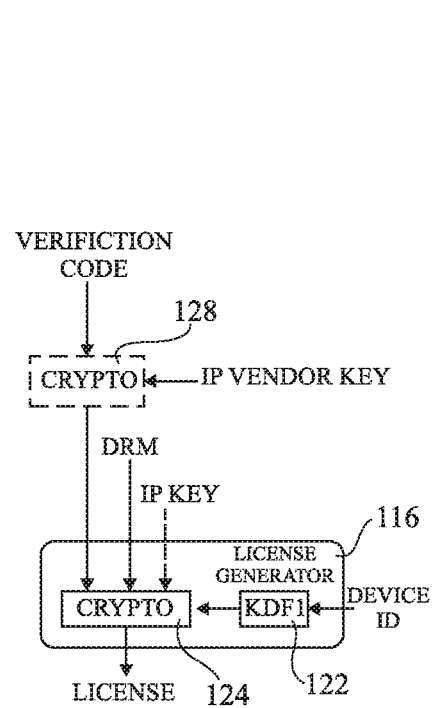
FIG. 1B illustrates a license generation circuit of FIG. 1A in more detail according to an example embodiment.

FIG. 1B illustrates the license generator 116 in more detail according to an example embodiment. The license generator 116 for example includes a key derivation function (KDF1) block 122, which generates a device key DK based on the device ID provided by the integrated circuit. The license generator 116 also for example comprises a cryptographic circuit 124, which applies the device key to the verification code or codes of the IP blocks to be activated, in order to generate the license. For example, the cryptographic circuit 124 encodes the verification code(s) based on the device key by applying an encryption algorithm such as DES (Data Encryption Standard), AES (Advance Encryption Standard) or the like. The DRM data may also be encrypted and form part of the license. Furthermore, in an embodiment described below in relation to FIG. 6, an IP key is also provided to the license generator 116 and encrypted by the circuit 124 to be included in the license.

In some embodiments, rather than the license being generated by the IP vendor, the license is generated by the TTP, for example in the form of a SaaS (Software as a Service) solution. Thus the TTP comprises the license generator 116, which for example receives the device ID, and the verification code(s) from the IP vendor, and in some cases the IP key. As represented by a block 128 (CRYPTO), in some embodiments, the verification code(s) may be encrypted, by the IP vendor, using an IP vendor key (IP VENDOR KEY), and the IP vendor key is also for example stored by the IP vendor within the IP block, permitting the verification code(s) to be decrypted. In this way, even the TTP cannot access the verification codes.

The license generation operation permits a count to be made by the TTP or IP vendor of the number of integrated circuits for which licenses have been granted. In the case that each license is valid for only a single integrated circuit, the number of generated licenses will equal the number of integrated circuit including the protected IP blocks, and thus a count can be made for the purposes of calculating royalties due to the IP vendor, or detecting a breach of conditions of a licensing agreement.

The generated license is then provided to the integrated circuit 102, for example to the license server 114, which decrypts the license based on the device identifier of the integrated circuit 102, and extracts the verification code. A symmetrical encryption/decryption algorithm is for example used to encrypt the verification code by the license generator 116 using the device key, and then to decrypt the license at the integrated circuit 102, such that if the keys are identical, the verification code will be successfully recuperated.

Alternatively, rather than using symmetrical encryption/decryption, asymmetrical encryption/decryption can be performed based on two keys. In such a case, the license server 114 for example derives a public key based on the device identifier, and the public key is supplied, with the device identifier, to the license generator 116. Rather than using a key derivation function 122 to generate a device key, the license generator 116 for example encrypts the license based on the public key. The license server 114 then for example receives the encrypted license from the license generator 116, and generates, based on the device identifier, a private key to form the device key for decrypting the license.

As yet a further alternative, other types of encrypting/deciphering schemes can be used by any of the cryptography blocks described herein, including the use of algorithms based on elliptic curves.

Figure 2:
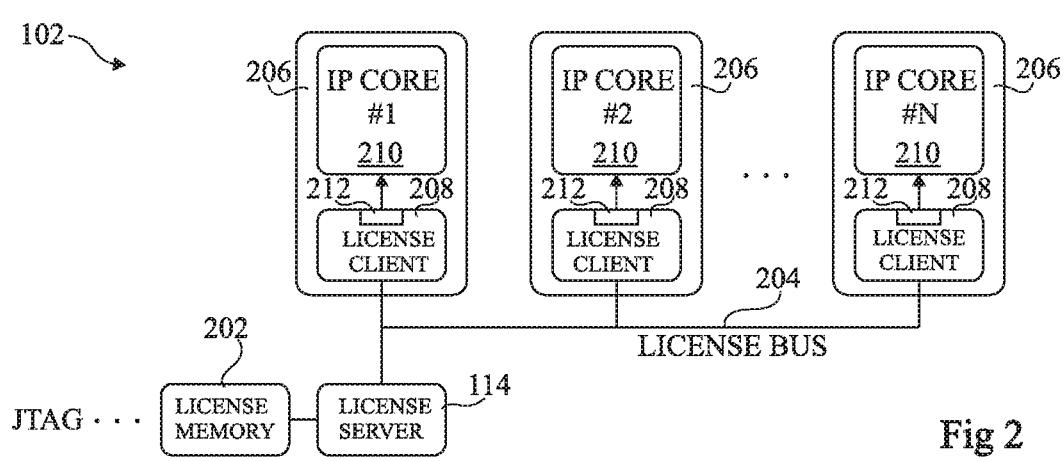
FIG. 2 schematically illustrates an integrated circuit comprising IP licensing components according to an example embodiment of the present disclosure.

FIG. 2 schematically illustrates licensing components of the integrated circuit 102 of FIG. 1A in more detail according to an example embodiment, in the case that the communication between the license server 114 and the IPs 103 is based on a client server configuration. However, in alternative embodiments, other types of communication configurations would be possible, such as a network on chip (NoC), or a multicast or broadcast protocol. Communication between the license server 114 and the IPs 103 is for example rendered secure using encryption.

As illustrated in FIG. 2, a JTAG (Joined Test Action Group) interface is for example used for transmitting the license received from the license generator 116 to a license memory (LICENSE MEMORY) 202 of the integrated circuit 102. Of course, it would be possible to use other interface standards, such as USB (universal serial bus).

The memory 202 is for example a RAM (Random Access Memory). The license memory 202 is internally coupled to the license server 114. The license server 114 for example communicates, via a license bus (LICENSE BUS) 204, with the protected IP blocks 206. In the example of FIG. 2, the license bus 204 is coupled to a license client circuit (LICENSE CLIENT) 208 associated with each IP block 206, which is in turn coupled to the rest of the IP block 206, labelled as IP cores (IP CORE) 210 in FIG. 2. In the example of FIG. 2, there are N IP cores 1 to N, where N is for example equal to an integer of 2 or more.

The license client 208 of each IP block 206 for example verifies the license, and based on this verification, provides the activation code to the corresponding IP core in order to activate its functionalities. For example, each license client 208 comprises an activation code register 212 into which the activation code is loaded if the license is found to be valid. The register 212 of each license client is coupled to the corresponding IP core 210 in order to activate its functionalities.

Figures 3A, 3B:
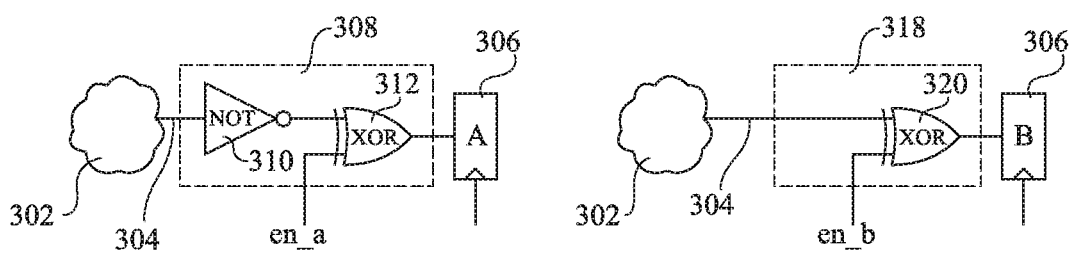
FIGS. 3A and 3B schematically illustrate activation circuits of an IP block according to an example embodiment of the present disclosure.

FIGS. 3A and 3B illustrate examples of circuits used for rending the activation of IP blocks dependent on one or more bits of an activation code, by inserting logic gates into a signal path of the IP block.

In the example of FIG. 3A, a circuit portion of the IP block represented by cloud 302 provides an output signal on a line 304, which is coupled to the input of a synchronous logic device (A) 306. To render the activation of the output line 304 dependent on an activation bit, an activation circuit 308 is inserted between the output line 304 and the input of the synchronous device 306. The circuit 308 for example comprises an inverter (NOT) 310 having its input coupled to the line 304, and its output coupled to one input of an exclusive OR (XOR) gate 312. The other input of the exclusive OR gate 312 receives an activation bit en_a, which should be high in order to permit the data signal present on the line 304 to propagate to the synchronous device 306.

FIG. 3B illustrates another example of an activation circuit 318 inserted in the same signal path as in the example of FIG. 3A. However, the circuit 318 comprises an exclusive OR (XOR) gate 320 having one input coupled to the line 304, and its other input coupled to receive an activation bit en_b. In this example, the activation bit should be low in order to permit the signal on line 304 to be propagated to the input of the synchronous device (B) 306.

Thus FIGS. 3A and 3B illustrate examples of circuits that can be inserted in order to activate circuit portions of the IP blocks based on high and low activation bits respectively. Similar circuits may be inserted at various points within the IP block, such that the IP block will not function without the correct activation code. Of course, FIGS. 3A and 3B merely provide some examples of the logic gates that can be used to protect the IP block, and many different logic functions could be implemented based on the same principles. In some embodiments, the insertion is performed randomly, such that the activation code is a random value, and does not depend on the function of the underlying circuit. In alternative embodiments, the insertion could be non-random. Furthermore, while in the examples of FIGS. 3A and 3B the circuit 308 is used in the case of activation by a "1" bit of the activation code, and the circuit 318 is used in the case of activation by a "0" bit of the activation code, in alternative embodiments there are multiple different circuits that are used in the case of "1" and "0" bit activation, and the selection among these is circuits is random.

FIG. 4 schematically illustrates the license client 208 and the license server 114 of FIG. 2 in more detail according to an example embodiment.

The license client 208 comprises the activation register (ACTIVATION REGISTER) 212, which propagates an activation code to activation circuits (not illustrated in FIG. 4) of the IP core 210, via an activation bus (ACTIVATION BUS) 404.

In the example of FIG. 4, the activation code (ACTIVATION CODE [ROM]) is stored in a memory 405 of the license client 208, which is for example a ROM (Read Only Memory), and is only loaded into the activation register 212 when a load signal LOAD is asserted on a line 406. The load signal is for example asserted only upon successful verification of the verification code received via the license server 114.

In one embodiment, the verification code extracted from the license by the license server 114 comprises the activation code. In this case, to verify the license by the license client 208, the activation code stored in the memory 405 is for example used to derive a key for encrypting a challenge signal transmitted to the license server 114, and to decrypt the response. In particular, the activation code is transmitted to a key derivation function block (KDF2) 408, which generates an IP key (IP KEY) based on the activation code. A cryptographic block (CRYPTO) 410, which for example applies the AES encryption/decryption algorithm, encrypts a challenge value (CHALLENGE) 412, which is for example generated by a random number generator (RNG) 414. In some embodiments, the RNG 414 is a true random number generator, or a pseudo random number generator (PRNG). The encrypted challenge value is transmitted to the license server 114 via the license bus 204.

At the license server 114, a cryptographic circuit (CRYPTO) 416 for example applies the same algorithm as the block 410 to decrypt the challenge based on an IP key derived from the activation code received with the license. In particular, the cryptographic block 416 receives the IP key (IP KEY) from a key derivation function block (KDF2) 418, which in turn receives the activation code extracted from the license stored in the license memory 202. The activation code is extracted by a cryptographic circuit (CRYPTO) 420, which decrypts the license based on a device key (DEVICE KEY) provided by a key derivation function (KDF1) block 422. The KDF1 block 422 receives the device ID from a circuit (DEVICE ID) 423, which for example generates and supplies the device ID upon request from the KDF block 422, or is a memory storing the device ID. The key derivation function applied by block 422 is for example the same as the one applied by the block 122 of FIG. 1B, such that the device key is the same.

Alternatively, as mentioned above, the key derivation function applied by block 422 may generate public and private keys, the private key being used as the device key for decrypting the license.

The key derivation function KDF1 applied by blocks 122 and 422, and the key derivation function KDF2 applied by blocks 408 and 418 are for example secret cryptographic functions for deriving the device key and IP Key in a secure manner. In some embodiments, the key derivation functions could be based on a further key stored by the blocks 122, 422 and/or 408, 418.

A response circuit (RESPONSE) 424 for example receives the challenge value decrypted by the block 416, and generates a response. For example, the response is a simple operation such as adding one to the challenge, or performing a permutation of the challenge, or a more complex operation. Additionally, the response may include DRM data extracted from the license by the cryptographic block 420.

The response is encrypted by the cryptographic block 416 based again on the IP key, and returned to the cryptographic block 410 over the license bus 204 for decryption by the cryptographic block 410. In the license client 208, the response is provided to a checker circuit (CHECKER) 426 of the license client 208, which verifies that the response corresponds to an accepted derivation of the challenge. If the response is found to be valid, the load signal is asserted on line 406 such that the activation register 212 loads of the activation code from the ROM 404.

Furthermore, in the case that the response includes DRM data extracted from the license, the checker for example stores the DRM data to a memory 428 and/or makes the DRM data available to the IP core 210. The DRM data may limit the activation to a certain type of circuit, such as ASIC, FPGAs, etc. Additionally or alternatively, the DRM data for example sets a time limit and/or geographical limit on the activation of the IP block. For example, if a geographical limit is applied, the DRM data for example defines a zone in which the IP block can be activated, and position data provided by a positioning device, such as a GPS (global positioning system) device, in the device 102, is used to verify whether the device remains in the authorized zone. In the case that the DRM data indicates that the license has a limited validity period, the checker 426 for example activates a timer, for example implemented using a counter, in order to verify when the limited validity period of the license expires. When this period expires, the checker 426 for example deactivates the load signal, such that the activation register 212 is reset, and the IP block is deactivated again. Alternatively, the DRM information may be incorporated directly in the part of the verification code provided in the response, causing only part of the activation code to be loaded to the activation register, and thus unlocking only part of the IP circuit.

In another embodiment, the verification code extracted from the license does not comprise the activation code. In this case the license client 208 for example comprises a further memory (not illustrated), which is for example a ROM, and stores the verification code. This code is used to determine the IP key supplied to the cryptographic circuit 410. The method as described above is then used to verify the verification code, and if verification is successful, the activation code stored in memory 405 is loaded into the activation register 212.

Rather than using the key derivation function circuit 418 to determine the IP key, it may be transmitted with the license. Indeed, as described in relation to FIG. 1B, the license generator 116 may incorporate the IP key in the license.

FIG. 5 is a flow diagram illustrating operations in a method, based on the circuit of FIG. 4, for activating an IP block using a license.

In an operation 501, the license is received by the license server 114.

In subsequent operations 502 to 504, the license is for example verified. These operations are for example performed upon runtime of the circuit, for example each time the circuit is powered up. The license is available in the license memory 202. For example, the license is requested from an external source and loaded into the license memory 202 upon each power-up of the device. Alternatively, the license memory 202 may be a non-volatile memory storing the license even when the device is powered down.

In operation 502, the device key is derived from the device ID, which is for example a PUF value.

In operation 503, the license is decrypted using the device key to extract the verification code.

In operation 504, the verification code is verified by the IP license client 208, for example using a challenge/response protocol as described above, and the activation code is loaded from the ROM 404 to activation register 212 in order to activate the IP block.

An advantage of the implementation of FIG. 4 is that the activation code is not transmitted over the license bus 204, meaning that messages fraudulently intercepted on this bus cannot be used to obtain the activation code.

FIG. 6 schematically illustrates the license client 208 and the license server 114 of FIG. 2 in more detail according to an alternative embodiment to that of FIG. 4. Features in FIG. 6 that are the same or similar to those of FIG. 4 have been labelled with like reference numerals and will not be described again in detail.

In the embodiment of FIG. 6, the activation code is not stored in memory by the license client 208. Instead, the license client stores an IP key (IP KEY) in a memory 602, which is for example a ROM. This is for example the same IP key as the one provided to the cryptographic block 124 of the license generator 116 of FIG. 1B. Like in the embodiment of FIG. 4, the IP key is used by the cryptographic circuit 410 to encrypt a challenge value provided by a block 412.

In the licenser server 114, the IP key is extracted from the received license by the cryptographic block 420, and used by the cryptographic block 416 to decrypt the challenge value. In the embodiment of FIG. 6, a response message transmitted to the license client 208 for example comprises the response to the challenge, and also the verification code, which is extracted by the cryptographic block 420 as in the embodiment of FIG. 4. The response message may also comprise the DRM data. The response message is encrypted by the cryptographic block 416 based on the IP key.

In the license client 208, the cryptographic block 410 then decrypts the response message, and provides the response to the challenge, the verification code, and any DRM data, to the checker circuit 426. The checker circuit 426 checks that the challenge value was correctly modified by the response circuit 424, and passes any DRM data and verification code to a DRM circuit 604, which for example operates in a similar fashion to the DRM circuit 428 of FIG. 4.

The verification code for example comprises the activation code, in which case the activation code is then loaded directly to the activation register 212. Alternatively, the verification code corresponds to the activation code encrypted by an IP vendor key. In this case, the IP vendor key is for example stored in a further memory (not illustrated) of the license client 208, and used by the cryptographic circuit 410 to decrypt the verification code and extract the activation code, which can then be loaded to the activation register 212.

FIG. 7 is a flow diagram illustrating operations in a method, based on the circuit of FIG. 6, for activating an IP block using a license.

In an operation 701, the license is received by the license server 114.

In a subsequent operations 702 to 704, the license is for example verified. These operations are for example performed upon runtime of the device, for example each time the device is powered up. The license is available in the license memory 202. For example, the license is requested from an external source and loaded into the license memory 202 upon each power-up of the device. Alternatively, the license memory 202 may be a non-volatile memory storing the license even when the device is powered down.

In operation 702, the device key is derived from the device ID, which is for example a PUF value.

In operation 703, the license is decrypted using the device key to extract the activation code.

In operation 704, the activation code is received by the license client 206, and if the IP Key received with the license is correct, the activation code is transmitted to the activation register 112 in order to activate the IP block.

An advantage of the implementation of FIG. 6 is that the activation code is not stored in a ROM, and thus even if the IP key is fraudulently obtained, the protected IP block cannot be activated.

Whereas in the embodiments of FIGS. 4 and 6 cryptographic circuits 410, 416 are used to add security to the license bus 204, in alternative embodiments any system that ensures security of the data transferred between the license server 114 and the license client 208 could be employed. For example, a hash or signature function could be used, as will now be described with reference to FIG. 8.

Figure 8:
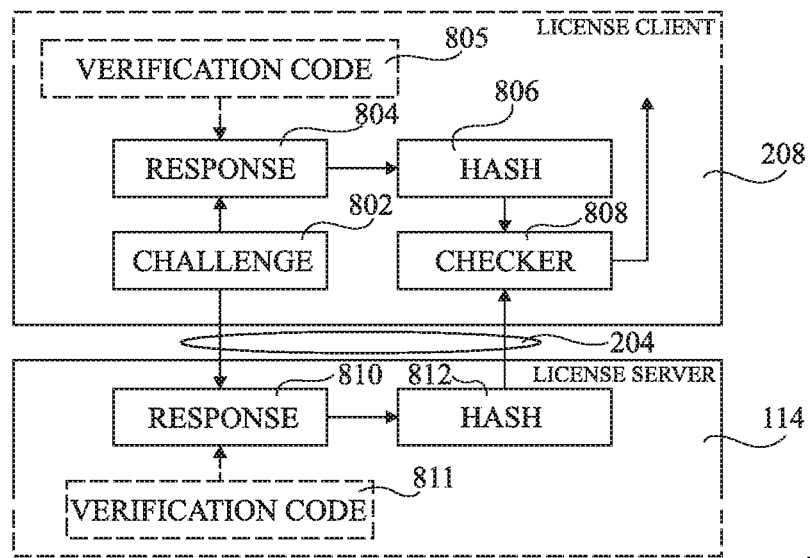
FIG. 8 schematically illustrates a secure interface between a license client and a license server of FIG. 2 in more detail according to a further example embodiment of the present disclosure.

FIG. 8 schematically illustrates portions of the license server 114 and of the license client 208 for communicating over the license bus 204 according to an example embodiment, and for example replace the KDF circuit 408, cryptographic blocks 410, 416, and challenge, response and checker circuits 412, 424 and 426 of FIGS. 4 and 6. This example assumes that the verification code is stored by the license client 208, and is therefore not transmitted over the license bus 204.

A challenge circuit (CHALLENGE) 802 for example generates a challenge value, which is for example a digital value based on a random value generated by a true random number generator (not illustrated in FIG. 8). The challenge value is provided to a response circuit (RESPONSE) 804, which generates a response to the challenge, based on the verification code (VERIFICATION CODE) stored in a memory 805, which is for example a ROM. The response is for example generated by applying a function to the challenge value and the verification code, such as an addition or multiplication. The response value is then provided to a hash computation circuit 806, which generates a hash value based on the response. In some embodiments, the signature generated by the hash function is a MAC (message authentication code) signature. The output of the hash circuit 806 is provided to a checker circuit (CHECKER) 808.

The challenge value generated by the challenge circuit 802 is also transmitted over the license bus 204 to the license server 114, for example to a response circuit (RESPONSE) 810 of the license server 114. The response circuit 810 generates the response using the same algorithm as the circuit 802, but based on the verification code 811 as extracted from the license. The response is then provided to a hash circuit (HASH) 812, which applies the same algorithm as the hash circuit 806, and transmits the result to the checker circuit 808 for comparison with the value generated by the hash circuit 806. If the verification code 811 received with the license matches the verification code stored in memory 805, verification is successful, and the activation code is loaded into the activation register 212 (not illustrated in FIG. 8).

The embodiment of FIG. 8 is merely one example. In alternative embodiments, the verification code is not used to modify the response 810, and instead the verification code is communicated to the license client 208 in a separate step. In such a case, the license client 208 does not for example store the verification code.

In the embodiments of FIGS. 4, 6 and 8, the device ID is for example read and used to verify a license in a secure manner, to prevent a hacker from forcing a same value of device ID to be used. For example, the license server 114 is adapted to read the identifier (DEVICE ID) associated with the integrated circuit over an interface protected by encryption. For example, the reading of the device ID is based on an additional challenge/response system similar to the one implemented by the blocks 410, 412, 414, 416 and 424 in FIG. 4, or by the blocks 802, 804, 806, 808, 810 and 812 in FIG. 8.

Whereas in the example of FIG. 2 the license client forms part of each IP block, in alternative embodiments the license client associated with each IP block may form part of a centralised licensing system, as will now be described with reference to FIG. 9.

Figure 9:
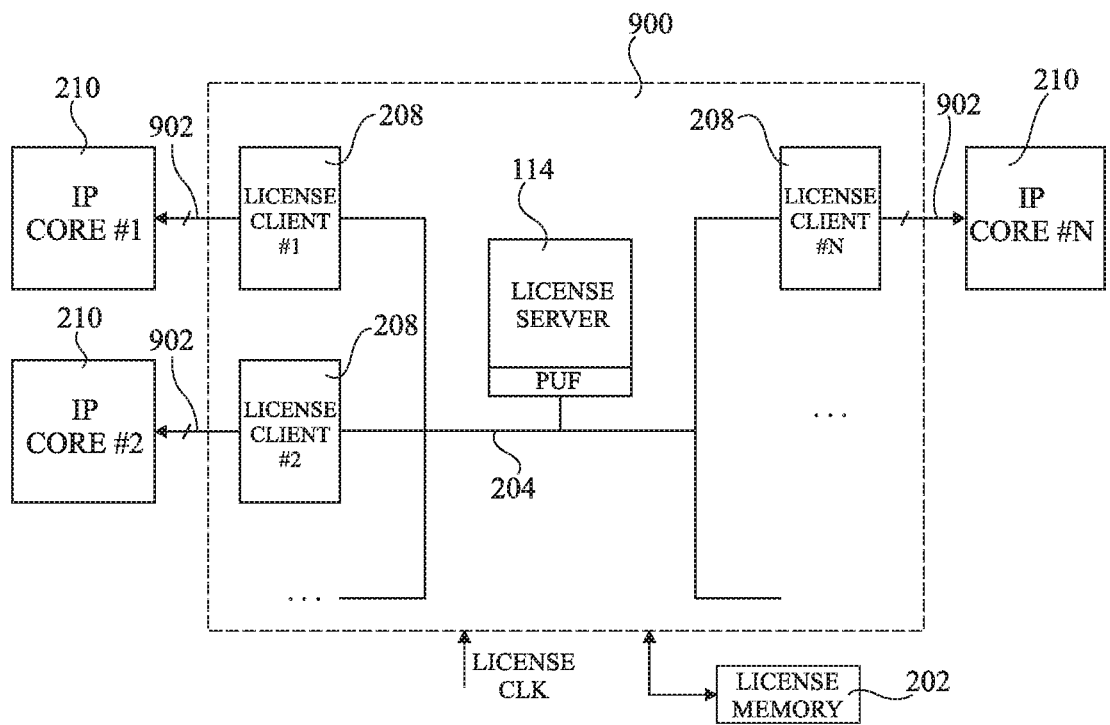
FIG. 9 schematically illustrates licensing components on an integrated circuit according to yet a further example embodiment of the present disclosure.

FIG. 9 illustrates a centralized licensing system 900 comprising the license server 114, and the license clients (LICENSE CLIENT #1 to #N) 208 associated with each IP core 210. Activation buses 902 are provided between each license client and each IP core for transmitting the activation code. Thus the license verification functions are provided by an independent sub-domain of the circuit, and this circuit 900 for example has a specific internal bus, a clock that can be separated from the IP blocks, and/or a memory dedicated for storing licenses.

Rather than the license server/client approach described thus far, many alternative approaches could be used, including a NoC (network on chip) approach. A distributed approach using a serial bus could be also be applied, as will now be described with reference to FIG. 10.

Figure 10:
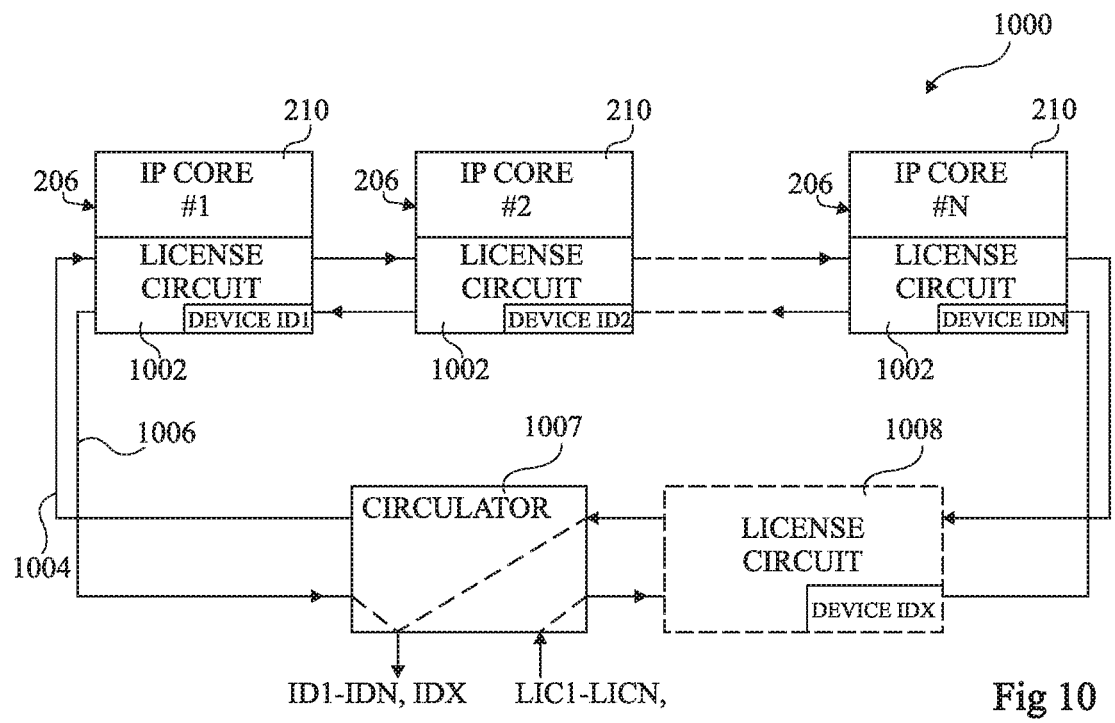
FIG. 10 schematically illustrates licensing components on an integrated circuit according to yet a further example embodiment of the present disclosure.

FIG. 10 illustrates a licensing system 1000 in which each IP block 206 comprises the corresponding IP core 1 to N, and a license circuit (LICENSE CIRCUIT) 1002. The license circuits 1002 are for example coupled to a serial bus 1004 for outputting data, and to a serial bus 1006 for inputting data. A circulator (CIRCULATOR) 1007 for example inputs data to the bus 1004 from an input port of the integrated circuit and outputs data from the bus 1006 to an output port of the integrated circuit.

Each license circuit 1002 for example generates and stores its own device identifier (DEVICE ID1 to DEVICE IDN), which forms part of the overall device ID. Furthermore, in some embodiments, a further license circuit (LICENSE CIRCUIT) 1008 not directly associated with any IP block generates a further device identifier DEVICE IDX. The overall device ID of the integrated circuit is for example equal to ID1+ID2+ . . . +IDN+IDX. The identifier IDX is for example provided in the case that the length of the combined identifiers ID1 to IDN is not sufficiently long to provide a reliable unique identifier.

Licenses LIC1 to LICN are for example input by the circulator 1007 to the bus 1006. Each license permits one of the IP blocks 206 to be activated. In particular, only the license encrypted by a key derived from the device identifier of one of the IP blocks 206 can be decrypted by that IP block and used to activate the IP block.

The licensing systems of FIGS. 2, 9 and 10 for example present the systems implemented on a given chip. In some cases, a circuit board may comprise several chips, each having one or more protected IP blocks.

Figures 11A, 11B:
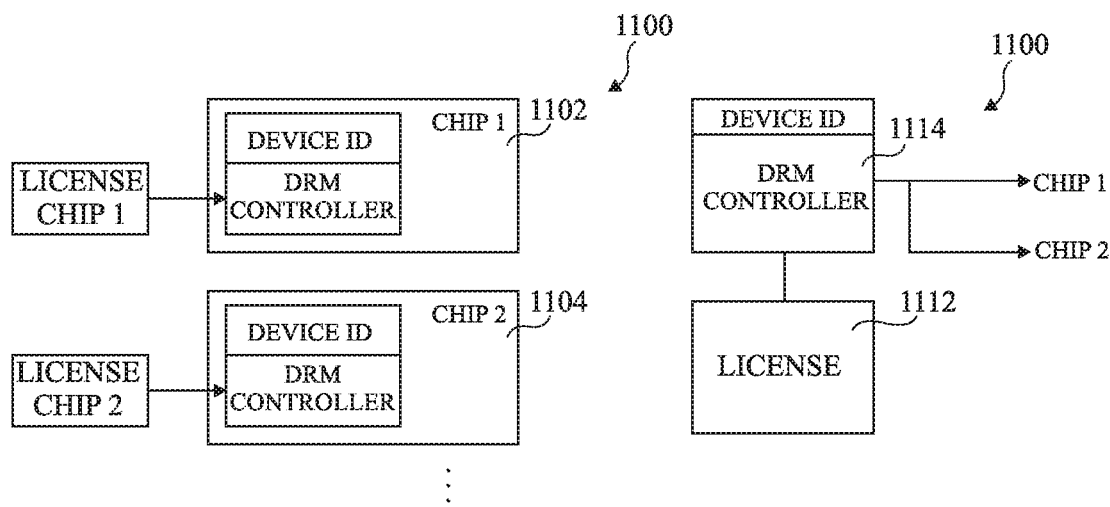
FIGS. 11A and 11B are board level views schematically illustrating licensing components according to an embodiment of the present disclosure.

FIG. 11A illustrates one example of a board level view 1100 of the licensing system. As illustrated, integrated circuits (CHIP 1, CHIP 2) 1102, 1104 each for example comprise a licensing system comprising a circuit for generating and/or storing a device ID (DEVICE ID) and a DRM controller (DRM CONTROLLER) for selectively activating one or more protected circuits based on license verification. A memory (LICENSE CHIP1) is for example coupled to the circuit 1102 and stores a license associated with the integrated circuit 1102, and a further memory (LICENSE CHIP2) is for example coupled to the integrated circuit 1104 and stores a license associated with the integrated circuit 1104. In some embodiments, the memories could form part of a same memory device.

FIG. 11B illustrates a board level view 1110 according to an alternative example to that of FIG. 11A, in which a single memory 1112 stores one or more licenses (LICENSE) for all of the chips CHIP1, CHIP2, etc. A DRM controller (DRM CONTROLLER) 1114 for example communicates the license to each chip. In some embodiments, there is a different device identifier associated with each of the chips, and the device identifier (DEVICE ID) may comprise the combination of the device ID of each chip, such as PUF (chip1)+PUF(chip2)+ . . . etc. Alternatively, a single device ID may be used for all chips, the chips CHIP1, CHIP2 etc. sharing the same device ID.

Figure 12:
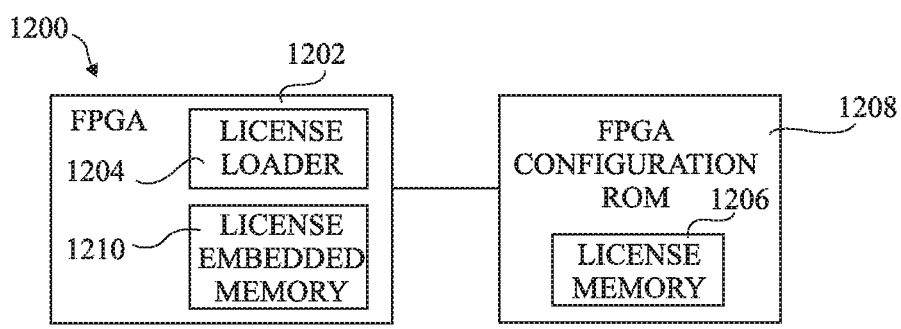
FIG. 12 schematically illustrates an FPGA (field programmable gate array) comprising licensing components according to an example embodiment of the present disclosure.

FIG. 12 illustrates a licensing system 1200 based on an FPGA 1202. The FPGA 1202 for example includes a license loader circuit (LICENSE LOADER) 1204 for loading a license, which is for example stored in a license memory (LICENSE MEMORY) 1206 of a configuration ROM (FPGA CONFIGURATION ROM) 1208. The configuration ROM is used to configure the FPGA upon power up of the device or after reset. The FPGA also for example comprises a license embedded memory (LICENSE EMBEDDED MEMORY) 1210, into which the license is loaded.

Having thus described at least one illustrative embodiment, various alterations, modifications and improvements will readily occur to those skilled in the art.

For example, it will be apparent to those skilled in the art that the implementations of symmetric encryption/decryption described herein could instead use asymmetric encryption/decryption.

Furthermore, it will be apparent to those skilled in the art that the various embodiments described in relation to the various embodiments could be combined, in alternative embodiments, in any combination.

The invention claimed is:

1. A device comprising a license verification circuit for selectively activating one or more protected circuits of the device, the license verification circuit being adapted to:
communicate outside the device an identifier associated with the device;
receive a first license;
after having received the first license, derive a device key from the identifier by applying a key derivation function and decrypt the first license using the device key in order to extract a first verification code; and
activate a first protected circuit by loading an activation code into an activation register associated with the first protected circuit based on a verification of the first verification code;
wherein the license verification circuit comprises:
a license server comprising a key derivation circuit for deriving the device key and a decryption circuit for decrypting the first license;
a first license client associated with the first protected circuit and comprising a first control circuit for activating the first protected circuit based on the first verification code; and
a second license client associated with a second protected circuit and comprising a second control circuit adapted to activate the second protected circuit by loading a second activation code into an activation register associated with the second protected circuit.

2. The device of claim 1, wherein the identifier associated with the device is provided by a physically unclonable function.

3. The device of claim 1, wherein the license verification circuit is adapted to read the identifier associated with the device over an interface protected by encryption.

4. The device of claim 1, wherein the license server is adapted to transmit the first verification code to the first license client and the second verification code to the second license client.

5. The device of claim 1, wherein the first verification code is encrypted by the license server based on a further key extracted from the first license and transmitted to the first control circuit of the first license client.

6. The device of claim 5, wherein the decryption circuit is further adapted to extract the further key from the first license.

7. The device of claim 1, wherein the first verification code comprises the activation code encrypted using an IP vendor key, the first license client being further adapted to store the IP vendor key in a memory and to decrypt the first verification code based on the IP vendor key to extract the activation code.

8. The device of claim 1, wherein the first license client comprises:
a challenge generation circuit comprising a random number generator adapted to generate a challenge value and to transmit the challenge value to the license server; and
a first response generation circuit adapted to generate a first response value based on at least the challenge value, wherein the license server comprises:
a second response generation circuit adapted to receive the challenge value and to generate a second response value based on at least the challenge value, wherein the first license client further comprises a verification circuit adapted to compare a first response value with the second response value.

9. The device of claim 8, wherein the first and second response generation circuits are adapted to generate the first and second response values based on a hash function.

10. The device of claim 1, wherein the first license client comprises a non-volatile memory storing a copy of the activation code, the first control circuit being adapted to load the copy of the activation code to the activation register based on a verification of one or more values of the first verification code.

11. The device of claim 1, wherein the verification code comprises further data indicating one or more of:
a period of validity of the license;
a geographic limit of the license;
a limitation of the license to one or more hardware types;
a temperature limitation of the license;
a voltage limitation of the license;
a bandwidth limitation of the license;
a speed limitation of the license;
an acceleration limitation of the license;
a humidity limitation of the license;
a light-level limitation of the license;
a magnetic field limitation of the license; and
a radioactivity limitation of the license.

12. The device of claim 1, wherein the first activation code comprises a plurality of bits, and the first protected circuit comprises a plurality of logic gates adapted to selectively activate a signal path of the first protected circuit, each logic gate having a first input coupled to a node of the first protected circuit and a second input coupled to receive one of the bits stored by the activation register.

13. A license verification system comprising a first IP module comprising a first license verification circuit adapted to:
receive a first license;
after having received the first license, derive a first device key from a first identifier associated with the first IP module by applying a key derivation function and decrypt the first license using the first device key in order to extract a first verification code; and
activate a first protected circuit of the first IP module by loading a first activation code into an activation register associated with the first protected circuit based on a verification of the first verification code; and
a second IP module comprising a second license verification circuit adapted to: receive a second license;
after having received the second license, derive a second device key from a second identifier associated with the second IP module by applying the key derivation function and decrypt the second license using the second device key in order to extract a second verification code; and
activate a second protected circuit of the second IP module by loading a second activation code into an activation register associated with the second protected circuit based on a verification of the second verification code; and
a circulator adapted to transmit the first license to the first IP module and the second license to the second IP module.

14. A system comprising:
a license generation circuit comprising:
a key derivation circuit adapted to derive a device key based on a device identifier of the device by applying a key derivation function; and an encryption circuit adapted to generate a first license for one or more protected circuits of said device by encrypting one or more activation codes using said device key; and
a license verification circuit for selectively activating the one or more protected circuits of the device, the license verification circuit being adapted to:
communicate outside the device the identifier associated with the device; receive the first license;
after having received the first license, derive the device key from the identifier by applying the key derivation function and decrypt the first license using the device key in order to extract a first verification code; and
activate a first protected circuit by loading an activation code into an activation register associated with the first protected circuit based on a verification of the first verification code;
wherein the license verification circuit comprises:
a license server comprising a further key derivation circuit for deriving the device key and a decryption circuit for decrypting the first license;
a first license client associated with the first protected circuit and comprising a first control circuit for activating the first protected circuit based on the first verification code; and
a second license client associated with a second protected circuit and comprising a second control circuit adapted to activate the second protected circuit by loading a second activation code into an activation register associated with the second protected circuit.

15. The license generation circuit of claim 14, wherein the encryption circuit is further adapted to encrypt a further key to be included in said first license.

16. A method of license verification for selectively activating one or more protected circuits of a device, the method comprising:
communicating, outside the device, an identifier associated with the device;
receiving a first license;
after having received the first license, deriving a device key from the identifier by applying a key derivation function and decrypting the first license using the device key in order to extract a first verification code; and
activating a first protected circuit by loading the first activation code into an activation register associated with the first protected circuit based on a verification of the first verification code;
wherein the device key is derived by a key derivation circuit of a license server of the device;
wherein the first license is decrypted by a decryption circuit of the license server;
wherein a first license client is associated with the first protected circuit and comprises a first control circuit for activating the first protected circuit based on the first verification code; and
wherein a second license client is associated with a second protected circuit and comprises a second control circuit adapted to activate the second protected circuit by loading a second activation code into an activation register associated with the second protected circuit.

* * * * *